Patented Apr. 18, 1950

2,504,404

UNITED STATES PATENT OFFICE 2,504,404

MANGANOUS ETHYLENE BIS-DITHIOCARBAMATE AND FUNGICIDAL COMPOSITIONS CONTAINING SAME

Albert L. Flenner, Wilmington, Del., assignor to E. I. du Pont de Nemours & Company, Wilmington, Del., a corporation of Delaware No Drawing. Application June 12, 1946, Serial No. 676,348

4 Claims. (Cl. 167—22)

This invention relates to a new composition of matter, manganous ethylene bis-dithiocarbamate, and is more specifically directed to uses of this composition as a fungicide and to fungicidal compositions comprising manganous ethylene bis-dithiocarbamate as an essential active ingredient in admixture with a carrier.

It is an object of this invention to provide a new compound having unusual fungicidal activity. A further object of this invention is the provision of dust and water-dispersible powders which are highly effective when used for the control of fungi. It is a still further object of this invention to provide methods for the control of fungi. Still further objects will become apparent hereinafter.

The foregoing and other objects of the invention are attained by means of the compound, manganous ethylene bis-dithiocarbamate, and by means of dusts and water-dispersible powder compositions comprising the compound.

The compound of this invention is prepared by reacting ethylene diamine and carbon disulfide in the presence of a free base and then reacting the salt formed with a manganous salt. In the first step of the reaction typical of the bases suitable for use are sodium, calcium, potassium, barium, and lithium hydroxide. The compound obtained by the reaction of ethylene diamine and carbon disulfide in the presence of one of the aforementioned bases is a water-soluble salt of ethylene bis-dithiocarbamic acid.

The compound of this invention is prepared from the water-soluble salt of ethylene bis-dithiocarbamate by reaction with a manganous salt, preferably a water-soluble inorganic salt such as manganous sulfate and manganous chloride.

The class of compounds of which the compound of this invention is a species and an outstanding member is disclosed in Hester Patent 2,317,765.

The compound of the invention is easily dispersed in water to form an aqueous suspension and this aqueous suspension may be applied by spraying to a material or surface to be protected from fungi. Alternatively, the compound of the invention may be admixed with carriers and conditioning agents to provide compositions suitable for application as a dust or to provide less concentrated water-dispersible powders.

Adjuvants or carriers suitable for admixture with the compound of the invention are preferably selected from the class of finely divided solids comprising talcs, prophyllites, natural clays, and diatomaceous earths, such materials having an average particle size less than about 50 microns. Other adjuvants which may be used in dust compositions and water-dispersible powders include such finely divided powders as calcium phosphate, tricalcium phosphate, calcium carbonate, magnesium carbonate, sulfur, lime, and flours such as walnut shell, wheat, redwood, soya bean, and cottonseed.

In preparing water-dispersible powders containing the compound of the invention in admixture with one of the aforementioned adjuvants, it is preferable to include in the composition an additional adjuvant or conditioning agent such as a wetting, dispersing, or emulsifying agent. Typical of the materials of this type are the sulfated higher alcohols, polyvinyl alcohols, polyethylene oxides, the alkali metal or amine salts of oleic acid, the sulfonated animal and vegetable oils such as sulfonated fish and castor oils, the sulfonated petroleum oils, alkali metal salts of alkylnaphthalene sulfonic acids, and such proprietary preparations as are listed in detail in U. S. Dept. of Agriculture Bulletin E-607.

The compositions of the invention may include other fungicidal and bactericidal agents and also insect toxicants. The following are typical bactericides and fungicides which are compatible with the compositions of the invention: sulfur, polysulfides such as lime-sulfur, the chlorinated phenols, aminomethyl sulfides, the long-chain quaternary ammonium halides, and metallic derivatives of dithiocarbamic acid.

Insect toxicants which may be included with manganous ethylene bis-dithiocarbamate of the compositions of the invention are such materials as metallic arsenates, fluosilicates, hexachlorocyclohexanes, phenothiazine, 2,2-bis(para-chlorophenyl)-1,1,1-trichloroethane, and 2,2-bis(para-methoxyphenyl)-1,1,1-trichloroethane, organic thiocyanates such as n-dodecyl thiocyanate, fenchyl thiocyanoacetate and beta(thiocyanoethyl) beta(butoxyethyl)ether, nicotine, anabasine (neo-nicotine), nor-nicotine, rotenone and its congeners, sabadilla, Ryania, hellebore, pyrethrum, N-isobutylundecylenamide, and aminomethyl sulfides.

The invention may be more fully understood by reference to the following examples:

Example 1

To 600 parts by weight of a 14 per cent aqueous solution of sodium hydroxide at about room temperature, there is added 87 parts by weight of a 69 per cent aqueous solution of ethylene diamine with agitation. A total of 158 parts by weight of carbon disulfide is added slowly with vigorous agitation of the reaction mass, keeping the temperature between 25-35° C. thruout the reaction period. There is thus formed a solution of disodium ethylene bis-dithiocarbamate.

The solution of disodium ethylene-bis-dithiocarbamate is diluted with 800 parts by weight of water and acetic acid is then added with agitation to adjust the solution to neutral to phenolphthaleine indicator. The diluted and neutralized solution is agitated slowly while adding 600 parts by weight of a 20 per cent aqueous solution of manganous chloride. The product, manganous ethylene bis-dithiocarbamate, which is a light yellow colored solid, precipitates as the manganous chloride solution is added. The product is removed by filtration and dried at about 50° C. in a forced draft oven. There is obtained 205 parts by weight of the product represented by the formula $Mn(-SSCNHCH_2CH_2NHCSS-)$. The dried material is then pulverized to give a finely powdered product.

The manganous ethylene bis-dithiocarbamate prepared according to the above process is dispersed in water in the amount of one to two pounds of the compound per hundred gallons of water. This aqueous suspension applied as a spray is very effective in the control of late blight (*Phytophthora infestans*) on tomatoes and potatoes. It is also extremely effective for the control of various other fungus diseases such as early blight (*Alternaria solani*) on tomato, and bean rust (*Uromyces appendiculatus*).

Example 2

The compound of Example 1 was intimately mixed with talc in the proportions of 1 part by weight of the manganous ethylene bis-dithiocarbamate for each 9 parts of talc to give a dust composition suitable for application to an area or surface to be protected against fungus growth.

Example 3

The compound of the invention prepared according to Example 1 is mixed with adjuvants and conditioning agents to give the following composition:

80.0% manganous ethylene bis-dithiocarbamate
14.7% china clay
5.0% diatomaceous earth
0.3% goulac This water-dispersible composition containing 80 per cent by weight as active ingredient is a free-flowing powder which is readily dispersed and suspended in water for fungicidal use.

I claim:
1. Manganous ethylene bis-dithiocarbamate.
2. A fungicidal composition comprising manganous ethylene bis-dithiocarbamate and a carrier therefor.
3. A fungicidal composition comprising manganous ethylene bis-dithiocarbamate in admixture with a finely divided solid having an average particle size less than about 50 microns.
4. A fungicidal composition comprising manganous ethylene bis-dithiocarbamate in admixture with a finely divided powder and a wetting agent.

ALBERT L. FLENNER.

REFERENCES CITED

The following references are of record in the file of this patent:

UNITED STATES PATENTS

| Number | Name | Date |
|---|---|---|
| 1,610,216 | Elley | Dec. 7, 1926 |
| 2,258,847 | Cramer | Oct. 14, 1941 |
| 2,286,738 | Hill | June 16, 1942 |
| 2,317,765 | Hester | Apr. 27, 1943 |
| 2,321,301 | How | June 8, 1943 |
| 2,410,862 | Bousquet et al. | Nov. 12, 1946 |

OTHER REFERENCES

Whitby et al., Proc. and Trans. Roy. Soc. (Canada), 3, XVIII, p. 114.

Delepine, Bull. Soc. Chem. (4), vol. III, page 645 (1908) (complete article pages 641-652).